United States Patent
Cao et al.

(10) Patent No.: US 10,515,438 B2
(45) Date of Patent: *Dec. 24, 2019

(54) SYSTEM AND METHOD FOR SUPPORTING IMAGE DENOISING BASED ON NEIGHBORHOOD BLOCK DIMENSIONALITY REDUCTION

(71) Applicant: SZ DJI TECHNOLOGY CO., LTD., Shenzhen (CN)

(72) Inventors: Zisheng Cao, Shenzhen (CN); Junping Ma, Shenzhen (CN); Xing Chen, Shenzhen (CN); Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/015,436

(22) Filed: Jun. 22, 2018

(65) Prior Publication Data

US 2018/0322619 A1 Nov. 8, 2018

Related U.S. Application Data

(63) Continuation of application No. 15/619,121, filed on Jun. 9, 2017, now Pat. No. 10,026,154, which is a
(Continued)

(51) Int. Cl.
*G06T 5/00* (2006.01)
*G06T 5/20* (2006.01)

(52) U.S. Cl.
CPC .............. *G06T 5/002* (2013.01); *G06T 5/20* (2013.01); *G06T 2200/28* (2013.01); *G06T 2207/10024* (2013.01); *G06T 2207/20012* (2013.01)

(58) Field of Classification Search
CPC ....... G06T 5/002; G06T 5/20; G06T 2200/28; G06T 2207/10024; G06T 2207/20012
(Continued)

(56) References Cited

U.S. PATENT DOCUMENTS

| 8,135,237 B2 | 3/2012 | Quan |
| 8,175,383 B2 | 5/2012 | Shiraishi |

(Continued)

FOREIGN PATENT DOCUMENTS

| CN | 102930519 A | 2/2013 |
| CN | 103020908 A | 4/2013 |

(Continued)

OTHER PUBLICATIONS

European Patent Office Action issued by the European Patent Office in counterpart European Patent Application No. 15 874 390.6 dated Jan. 18, 2019.

(Continued)

*Primary Examiner* — Ali Bayat

(74) *Attorney, Agent, or Firm* — Finnegan, Henderson, Farabow, Garrett & Dunner, L.L.P.

(57) ABSTRACT

System and method can support an image processing device. The image processing device operates to obtain a first set of characterization values, which represents a first group of pixels that are associated with a denoising pixel in an image. Also, the image processing device can obtain a second set of characterization values, which represents a second group of pixels that are associated with a denoising reference pixel. Furthermore, the image processing device operates to use the first set of characterization values and the second set of characterization values to determine a similarity between the denoising pixel and the denoising reference pixel. Then, the image processing device can calculate a denoised value for the denoising pixel based on the determined similarity between the denoising pixel and the denoising reference pixel.

28 Claims, 11 Drawing Sheets

Related U.S. Application Data continuation of application No. 15/349,773, filed on Nov. 11, 2016, now Pat. No. 9,773,297, which is a continuation of application No. PCT/CN2015/079093, filed on May 15, 2015.

(58) Field of Classification Search
USPC .......................................................... 382/167
See application file for complete search history.

(56) References Cited

U.S. PATENT DOCUMENTS

| | | | |
|---|---|---|---|
| 8,199,223 | B2 | 6/2012 | Sasaki |
| 8,675,104 | B2 | 3/2014 | Bosco et al. |
| 8,818,126 | B2 | 8/2014 | Shin et al. |
| 9,002,136 | B2 * | 4/2015 | Artyomov ............... G06T 5/002 382/275 |
| 9,852,353 | B2 * | 12/2017 | Lin ......................... G06K 9/46 |
| 2004/0071363 | A1 * | 4/2004 | Kouri ................. G06K 9/00516 382/276 |
| 2007/0127836 | A1 | 6/2007 | Subbotin |
| 2008/0075394 | A1 | 3/2008 | Huang et al. |
| 2009/0128662 | A1 | 5/2009 | Moon et al. |
| 2009/0226085 | A1 | 9/2009 | Shiraishi |
| 2009/0279808 | A1 | 11/2009 | Shiraishi |
| 2009/0324117 | A1 | 12/2009 | Demandolx |
| 2010/0259650 | A1 | 10/2010 | Sasaki |
| 2010/0309377 | A1 * | 12/2010 | Schoenblum ........... G06T 5/002 348/607 |
| 2011/0069886 | A1 | 3/2011 | Chien et al. |
| 2011/0069902 | A1 | 3/2011 | Yang et al. |
| 2011/0075935 | A1 | 3/2011 | Baqai et al. |
| 2011/0149122 | A1 | 6/2011 | Subbotin |
| 2011/0187902 | A1 | 8/2011 | Adams, Jr. et al. |
| 2012/0200754 | A1 | 8/2012 | Fainstain et al. |
| 2012/0224784 | A1 | 9/2012 | Cohen et al. |
| 2012/0224789 | A1 | 9/2012 | Chatterjee et al. |
| 2014/0118581 | A1 | 5/2014 | Sasaki et al. |
| 2014/0118582 | A1 | 5/2014 | Artyomov et al. |
| 2016/0132995 | A1 | 5/2016 | Lin et al. |
| 2017/0038931 | A1 | 2/2017 | Murase |

FOREIGN PATENT DOCUMENTS

| | | |
|---|---|---|
| CN | 103491280 A | 1/2014 |
| CN | 103679639 A | 3/2014 |
| CN | 103871035 A | 6/2014 |
| CN | 103927729 A | 7/2014 |
| CN | 104010114 A | 8/2014 |
| CN | 104202583 A | 12/2014 |
| JP | 2006-023959 A | 1/2006 |
| JP | 2007-536662 A | 12/2007 |
| JP | 2014-086956 A | 5/2014 |

OTHER PUBLICATIONS

M. Mahmoudi et al: "Fast Image and Video Denoising via Nonlocal Means of Similar Neighborhoods", IEEE Signal Processing Letters, vol. 12, No. 12, Dec. 2005, pp. 839-842, XP055537140, US ISSN: 1070-9908, DOI: 10.1109/LSP.2005.859509.

European Patent Office Action issued by the European Patent Office in counterpart European Patent Application No. 15 874 390.6 dated Aug. 10, 2018.

Extended European Search Report issued by the European Patent Office in counterpart European Patent Application No. 15 874 390.6 dated Jul. 3, 2017.

International Search Report issued by State Intellectual Property Office of the P.R. China dated Sep. 30, 2015.

Li-Li Xing et al: "The algorithms about fast non-localmeans based image denoising", ACTA Mathematicae Applicatae Sinica; (English Series), Springer, Berlin, DE, vol. 28, No. 2; Apr. 29, 2012 (Apr. 29, 2012), pp. 247-254, XP035048810, ISSN: 1618-3932, DOI: 10.1007/S10255-012-0139-5.

Zhang et al.: "Color demosaicking by local directional interpolation and non adaptive thresholding", SPIE, PO Box 10 Bellingham WA 98227-0010, USA, Jun. 27, 2011 (Jun. 27, 2011), XP040560948.

Losson O et al: ""Chapter 5—Comparison of Color Demosaicing Methods"", Advances in Imaging and Electron Phy, vol. 162. Jan. 1, 2010 (Jan. 1, 2010), pp. 173-265, XP009192124, ISSN: 1076-5670, DOI: 10.1016/S1076-5670(10)62005-8.

English-language extended Search Report from the European Patent Office in counterpart European Application No. EP 15 87 4390.6, dated Jul. 3, 2017.

Fukushima, "Non-local Means Filter," Oct. 31, 2001.

International Search Report dated Sep. 30, 2015, issued by the State Intellectual Property Office of the P.R. China in counterpart International Application No. PCT/CN2015/079093; 4 pages.

Japanese Office Action dated May 8, 2018, by the Japanese Patent Office in counterpart Japanese Patent Application No. 2012016-554733.

Losson, O. et al., "Comparison of Color Demosaicing Methods," Advancing in Imaging and Electron Physics, vol. 162, pp. 173-265, (2010).

Notification of Reasons for Refusal from the Japanese Patent Office, in counterpart Japanese Application No. 2016-554733 dated Dec. 5, 2017.

Notification of Reasons for Refusal from the Japanese Patent Office in counterpart Japanese Application No. 2016-554733, dated Jul. 13, 2017.

Written Opinion dated Sep. 30, 2015, issued by the State Intellectual Property Office of the P.R. China in counterpart International Application No. PCT/CN2015/079093; 4 pages.

Xing, L. et al., "The Algorithms about Fast Non-local Means Based Image Denoising," Acta Mathematicae Applicatae Sinica, English Series, vol. 28, No. 2, pp. 247-254, (2012).

Zhang et al., "Color demosaicking by local directional interpolation and nonlocal adaptive thresholding," Journal of Electronic Imaging, vol. 20, No. 2, 023016-1-16, (2011).

* cited by examiner

SYSTEM AND METHOD FOR SUPPORTING IMAGE DENOISING BASED ON NEIGHBORHOOD BLOCK DIMENSIONALITY REDUCTION

CROSS-REFERENCE TO RELATED APPLICATIONS

This application is a continuation application of U.S. application Ser. No. 15/619,121, filed Jun. 9, 2017, which is a continuation application of U.S. application Ser. No. 15/349,773, filed Nov. 11, 2016, which is a continuation application of International Application No. PCT/CN2015/079093, filed on May 15, 2015, the entire contents of each are hereby incorporated by reference in their entireties.

BACKGROUND OF THE INVENTION

The disclosed embodiments relate generally to digital image signal processing and more particularly, but not exclusively, to image denoising.

With the development of faster and higher resolution image sensors, the modern camera becomes ever more versatile and powerful. For example, the charge-coupled device (CCD) and complementary metal-oxide-semiconductor (CMOS) image sensors, which are pixel based, are used extensively in the modern digital image system.

This is the general area that embodiments of the invention are intended to address.

BRIEF SUMMARY OF THE INVENTION

Described herein are systems and methods that can support an image processing device. The image processing device operates to obtain a first set of characterization values, which represents a first group of pixels that are associated with a denoising pixel in an image. Also, the image processing device can obtain a second set of characterization values, which represents a second group of pixels that are associated with a denoising reference pixel. Furthermore, the image processing device operates to use the first set of characterization values and the second set of characterization values to determine a similarity between the denoising pixel and the denoising reference pixel. Then, the image processing device can calculate a denoised value for the denoising pixel based on the determined similarity between the denoising pixel and the denoising reference pixel. Other objects and features of the present invention will become apparent by a review of the specification, claims, and appended figures.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings briefly described herein.

FIGS. 5A-D illustrate different types of exemplary neighborhood blocks in an RGB image, in accordance with various embodiments of the present invention.

DETAILED DESCRIPTION OF THE INVENTION

Figure 1:
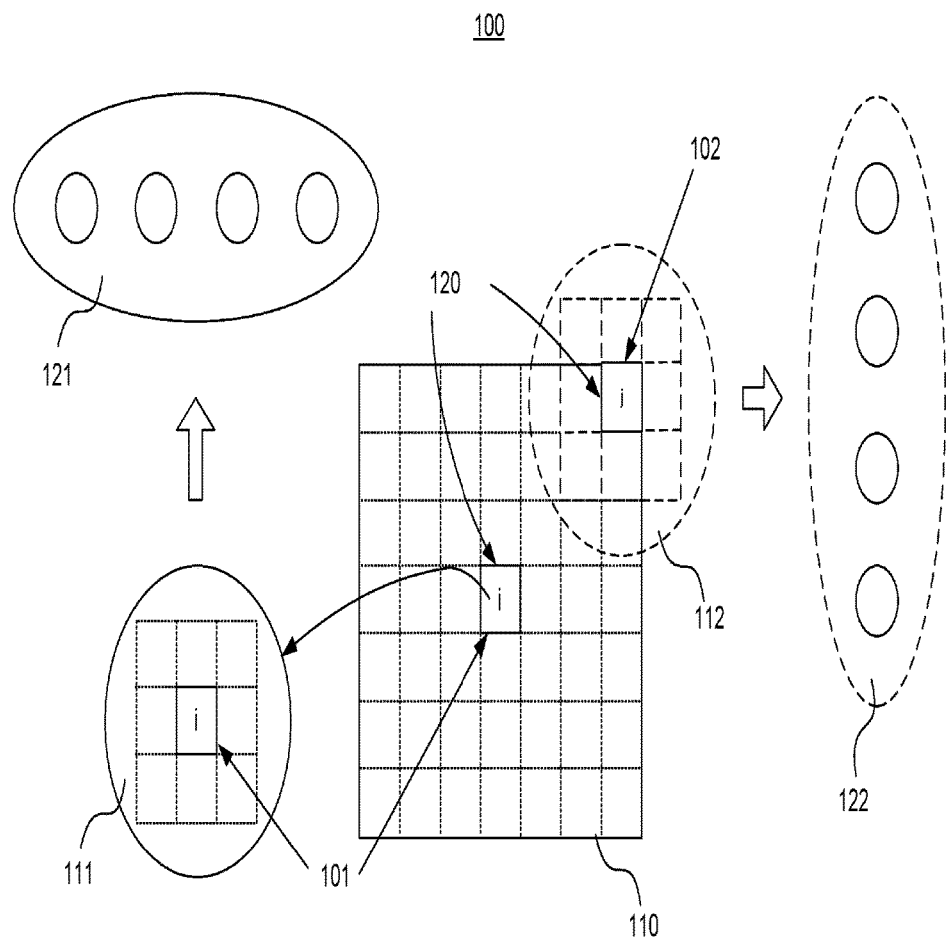
FIG. 1 is an exemplary illustration of supporting image denoising based on neighborhood block dimensionality reduction, in accordance with various embodiments of the present invention.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses an RGB image format as example for a digital image format. It will be apparent to those skilled in the art that other types of digital image formats can be used without limitation.

Image Denoising

The image collecting process can use image sensors for collecting various image information. For example, a color filter array (CFA), or a color filter mosaic (CFM) may be placed over the CCD and CMOS image sensors. The CFA or CFM involves a mosaic of tiny color filters, which are prone to introducing noise into the captured image.

In accordance with various embodiments of the present invention, an image process can perform various denoising operations on the captured images. The denoising operations can be either pixel-based or patch-based. The pixel-based denoising method, such as a bilateral filter method, is easy to implement, e.g. using the application-specific integrated circuit (ASIC). On the other hand, the patch-based denoising method, such as a non-local means algorithm, can be used for obtaining a digital image with better quality.

For example, the non-local means algorithm can be applied on a digital image (I) with noise (e.g., $v = \{v(i) | i \in I\}$), such as a denoising pixel (i) in the digital image (I). The value for the denoised image pixel, $NL[v](i)$, can be determined based on the weighted contribution by all other pixels in the image (I), using the following equation.

$$NL[v](i) = \sum_{j \in I} w(i, j) v(j)$$

The weight function w(i,j) for a denoising reference pixel (j) can satisfy the following weight conditions.

$$0 \leq w(i, j) \leq 1$$

$$\sum_{j \in I} w(i, j) = 1$$

Furthermore, the weight function w(i,j) for a denoising reference pixel (j) can be determined based on the similarity between the denoising pixel (i) and the denoising reference pixel (j).

For example, the similarity can be defined as the distance between two vectors, $v(\mathcal{N}_i)$ and $v(\mathcal{N}_j)$, whereas $\mathcal{N}_i$ is a multi-dimensional vector that represents a neighborhood block that is associated with (such as surrounding) the denoising pixel (i) and $\mathcal{N}_j$ is a multi-dimensional vector that represents a neighborhood block that is associated with the denoising reference pixel (j).

Thus, the weight function w(i,j) for the denoising reference pixel (j) can be determined using the following equation.

$$w(i, j) = \frac{1}{Z(i)} e^{-\frac{\|v(\mathcal{N}_i) - v(\mathcal{N}_j)\|_{2,\alpha}^2}{h^2}}$$

Whereas, Z(i) is the normalization constant, which can be defined using the following equation.

$$Z(i) = \sum_{j \in I} e^{-\frac{\|v(\mathcal{N}_i) - v(\mathcal{N}_j)\|_{2,\alpha}^2}{h^2}}$$

Neighborhood Block Dimensionality Reduction

FIG. 1 is an exemplary illustration of supporting image denoising based on neighborhood block dimensionality reduction, in accordance with various embodiments of the present invention. As shown in FIG. 1, an imaging process 100 can use a filter window 110 for denoising a pixel 101 in an image, e.g. a Bayer (mosaic) image.

In accordance with various embodiments of the present invention, the filter window 110 includes a plurality of denoising reference pixels (e.g. the pixel 102), which can be used for denoising the pixel 101.

When the filter window ($\Omega_i$) 110 is used for denoising a pixel (i) 101 in a digital image with noise (v={v(i)|i∈I}), the value of the denoised image pixel, (NL[v](i)), for the denoising pixel (i) 101 can be determined using the following equation.

$$NL[v](i) = \sum_{j \in \Omega_i} w(i, j) v(j)$$

The weight function w(i,j) can be determined based on the similarity 120 between the denoising pixel (i) 101 and a denoising reference pixel (j) 102 in the filter window ($\Omega_i$) 110.

For example, the similarity 120 can be defined as the distance between two vectors, $v(\mathcal{N}_i)$ and $v(\mathcal{N}_j)$, whereas $\mathcal{N}_i$ is a multi-dimensional vector that represents a neighborhood block 111 surrounding the denoising pixel (i) 101 and $\mathcal{N}_j$ is a multi-dimensional vector that represents a neighborhood block 112 surrounding the denoising reference pixel (j) 102.

In order to simplify the computation process, the weight function w(i,j) can be determined based on the rectilinear distance (i.e. the $L_1$ distance), using the following equation.

$$w(i, j) = \frac{1}{Z(i)} e^{-\frac{\|v(\mathcal{N}_i) - v(\mathcal{N}_j)\|_1}{h^2}}$$

Whereas, Z(i) is the normalization constant, which can be defined using the following equation.

$$Z(i) = \sum_{j \in \Omega_i} e^{-\frac{\|v(\mathcal{N}_i) - v(\mathcal{N}_j)\|_1}{h^2}}$$

In the example as shown in FIG. 1, the vectors, $v(\mathcal{N}_i)$ and $v(\mathcal{N}_j)$ are multi-dimensional vectors, since the neighborhood block 101 and the neighborhood block 102 are both three by three-by-three (3×3) blocks. Using the above equation, it may take seventeen (3×3+8) addition/subtraction operations for calculating the weight function w(i,j) for the denoising reference pixel (j). Thus, it may take eight hundred and thirty-three (17×7×7) operations to calculate the denoised value for the denoising pixel (i) 101 using the filter window ($\Omega_i$) 110, since the filter window ($\Omega_i$) 110 is a seven-by-seven (7×7) block.

In accordance with various embodiments of the present invention, the system can further reduce the computation cost for denoising a pixel 101 in an image by taking advantage of a neighborhood block dimensionality reduction feature.

As shown in FIG. 1, the system can use a characterization vector ($P_i$) 121, which includes a set of characterization values, for representing a group of pixels such as the pixels in the neighborhood block 111 associated with the denoising pixel (i) 101. Also, the system can use a characterization vector ($P_j$) 122, which includes a set of characterization values, for representing a group of pixels such as the pixels the neighborhood block 112 associated with the denoising pixel (j) 102. Additionally, the characterization vector ($P_i$) 121 and the characterization vector ($P_j$) 122 can be used for representing the pixels not restricted in regular neighborhood blocks, such as the pixels in irregular neighborhood blocks, neighborhood blocks with different sizes, or even discrete forms.

The weight function, w(i,j), which depends on the similarity between the denoising pixel (i) 101 and a denoising reference pixel (j) 102, can be defined as the distance between two characterization vectors, $P_i$ and $P_j$, using the following equation.

$$w(i, j) = \frac{1}{Z(i)} e^{-\frac{\|P_i - P_j\|_1}{h^2}}$$

Whereas, Z(i) is the normalization constant, which can be defined using the following equation.

$$Z(i) = \sum_{j \in \Omega_i} e^{-\frac{\|P_i - P_j\|_1}{h^2}}$$

In the case of an RGB image, both the characterization vectors ($P_i$ and $P_j$) may include four (4) color components. It may take seven (4+3) operations for the imaging process 100 to determine the similarity between the denoising pixel (i) 101 and a denoising reference pixel (j) 102. Thus, it may take three hundred forty-three (7×7×7) operations to calculate the denoised value for the denoising pixel (i) 101 using the filter window ($\Omega_i$) 110, which is a seven-by-seven (7×7) block.

Thus, by taking advantage of the neighborhood block dimensionality reduction feature, the system can significantly reduce the computation cost for determining the similarity between the denoising pixel (i) 101 and a denoising reference pixel (j) 102, and thereby reduces the computation cost for calculating the denoised value for the denoising pixel (i) 101 using the filter window ($\Omega_i$) 110.

Figure 2:
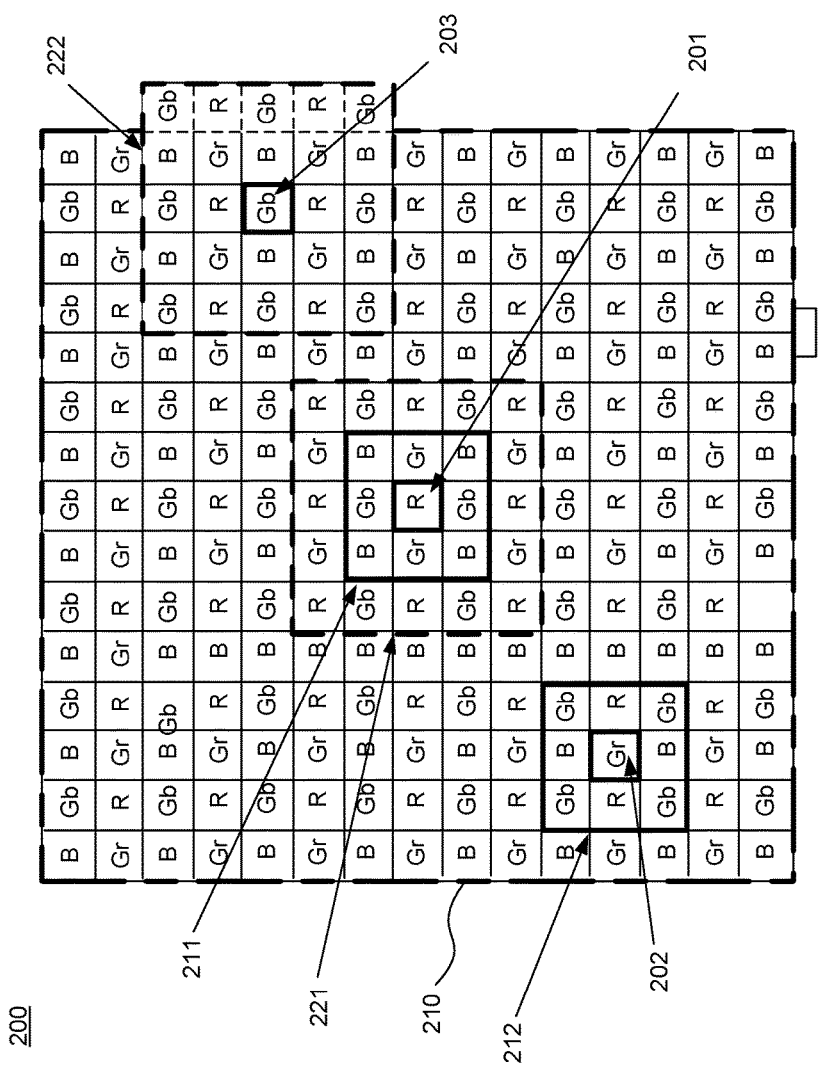
FIG. 2 is an exemplary illustration of a filter window for denoising a pixel in an RGB image, in accordance with various embodiments of the present invention.

FIG. 2 is an exemplary illustration of a filter window for denoising a pixel in an RGB image, in accordance with various embodiments of the present invention. As shown in FIG. 2, an imaging process can use a filter window 210 for performing a denoising operation on a denoising pixel 201 in an RGB image 200.

In accordance with various embodiments of the present invention, the denoising pixel 201 in the RGB image 200 may have different colors. In the example as shown in FIG. 2, the denoising pixel 201, which locates at the center of the filter window 210, is a red color pixel (R). In general, the denoising pixel 201 can be a red pixel (R), a blue pixel (B), or a green pixel (Gr or Gb) in the RGB image 200 without limitation.

As shown in FIG. 2, the determining of the similarity between the denoising pixel 201 and the denoising reference pixels (e.g. 202 and 203) can be based on the different neighborhood blocks (211-212 and 221-222).

The neighborhood blocks can be in different sizes. For example, the neighborhood blocks 211 and 212 are both three-by-three (3×3) blocks, while the neighborhood blocks 221 and 222 are both five-by-five (5×5) blocks. Also, the neighborhood block 222 may include pixels that are outside of the filter window 210.

Additionally, the neighborhood blocks may be in different geometry shapes, such as a polygon, a circle, an ellipse, or other regular shapes such as a cube, or a sphere. Also, the neighborhood blocks may be in various irregular shapes.

Figure 3:
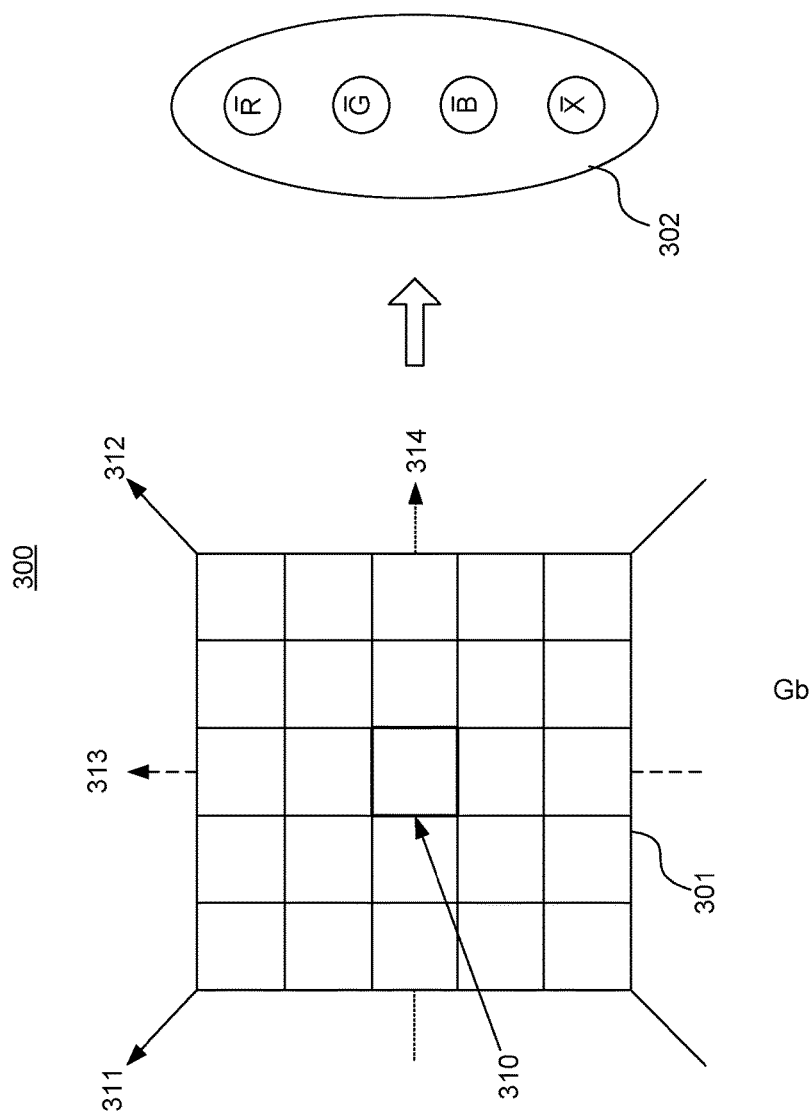
FIG. 3 is an exemplary illustration of supporting dimensionality reduction for a neighborhood block, in accordance with various embodiments of the present invention.

FIG. 3 is an exemplary illustration of supporting dimensionality reduction for a neighborhood block, in accordance with various embodiments of the present invention. As shown in FIG. 3, an imaging process 300 can determine a characterization vector 302 based on a neighborhood block 301 with a center pixel 310, which can be either a denoising pixel or a denoising reference pixel.

In accordance with various embodiments of the present invention, the characterization vector 302 can include various color components that correspond to the different colors in a color model used by the image.

For example, when the image is an RGB image, the characterization vector 302 can include a component (R) for the red color, a component (G) for the green color, and a component (B) for the blue color. Thus, the characterization vector 302 can be represented using the following equation.

$$P = [\overline{RGB}]^T$$

Additionally, the characterization vector can include a grayscale component ($\overline{X}$), in which case the characterization vector 302 can be represented using the following equation.

$$P = [\overline{RGBX}]^T$$

In accordance with various embodiments of the present invention, different approaches can be employed for determining the various color components in the characterization vector 302.

For example, a color component in the characterization vector 302 can be determined based on the value for the color, which is associated with the center pixel 310 in the neighborhood block 301.

Furthermore, a non-selective averaging method can be used for determining a color component in the characterization vector 302.

The non-selective averaging method can be used for determining a color component in the characterization vector 302, when a set of pixels in the neighborhood block 301, having a color associated with the color component, constitute only one direction (e.g. 313 or 314) through the center pixel 310 of the neighborhood block 301.

Also, the non-selective averaging method can be used for determining a color component in the characterization vector 302, when a set of pixels in the neighborhood block 301, having a color associated with the color component, are substantially isotropic in the neighborhood block 301.

Additionally, a selective averaging method can be used for determining a color component in the characterization vector 302, when a set of pixels in the neighborhood pixel block 301, having a color associated with the color component, constitute multiple directions (e.g. 311-312) in the neighborhood block.

In accordance with various embodiments of the present invention, the imaging process 300 can support the selective averaging method based on the directional judgment. For example, the selective averaging method, which is gradient-based, can apply the averaging calculation on a subset of the pixels, having a color associated with the color component. Here, the subset of the pixels can be associated with the direction (311 or 312) with the minimum gradient in the neighborhood pixel block 301.

Figure 4:
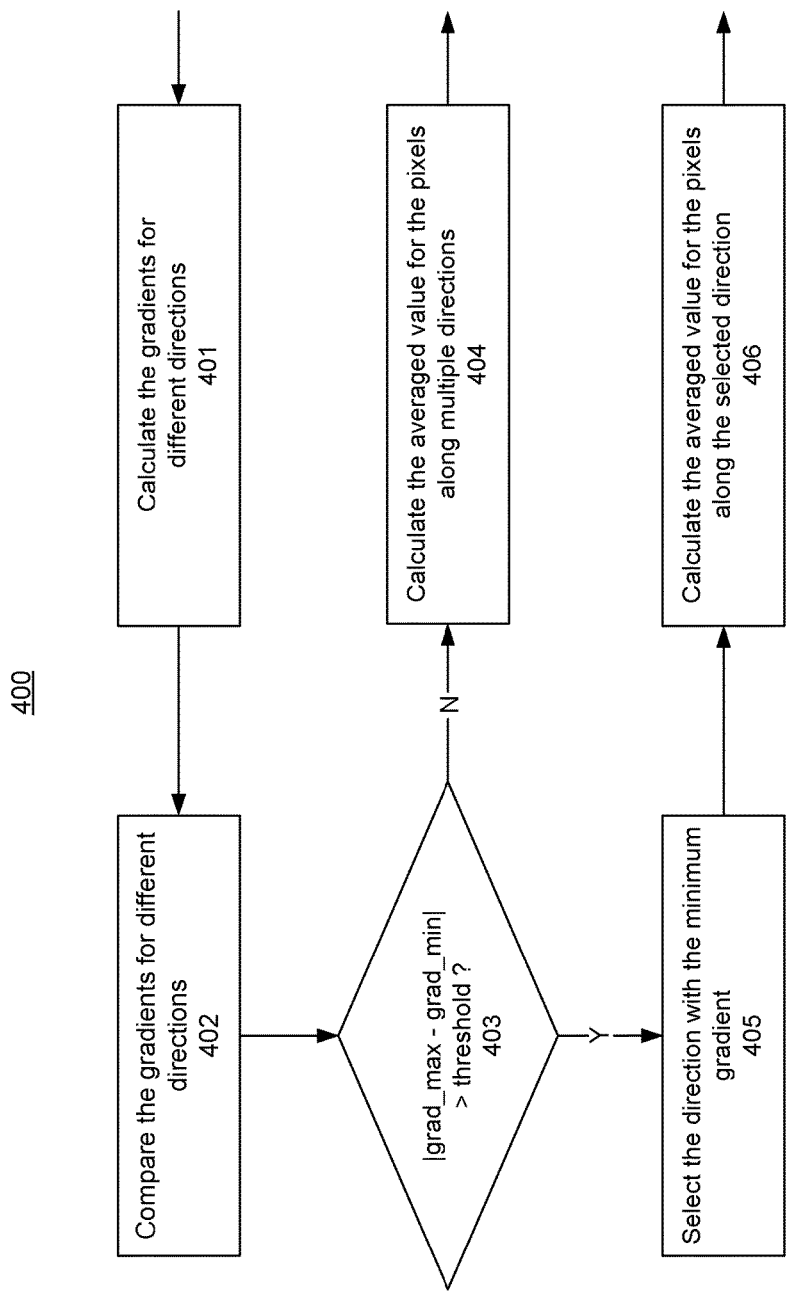
FIG. 4 is an exemplary illustration of using a selective averaging method for performing dimensionality reduction, in accordance with various embodiments of the present invention.

FIG. 4 is an exemplary illustration of using a selective averaging method for supporting dimensionality reduction, in accordance with various embodiments of the present invention. As shown in FIG. 4, an imaging process 400 can apply a selective averaging method on pixels with the same color in a neighborhood block, based on the directional judgment.

At step 401, the imaging process 400 can calculate the gradients for the pixels with same color along different directions in a neighborhood block. At step 402, the imaging process 400 can compare the gradients for different directions to obtain the maximum gradient (e.g. grad_max) and the minimum gradient (e.g. grad_min).

At step 403, the imaging process 400 can compare the difference between the maximum gradient and the minimum gradient (i.e., |grad_max-grad_min|) with a threshold (e.g., TH).

At step 404, if the difference between the maximum gradient and the minimum gradient is less or equal to the threshold (i.e., |grad_max-grad_min|<=TH), the imaging process 400 can use a non-selective averaging method to calculate the average value for the pixels along multiple directions.

Otherwise, (i.e., if |grad_max-grad_min|>TH), at step 405, the imaging process 400 can select the pixels along the direction with the minimum gradient. Then, at step 406, the imaging process 400 can calculate the average value for the pixels along the selected direction (i.e., the pixels along the direction with the minimum gradient).

Figures 5A, 5B, 5C, 5D:
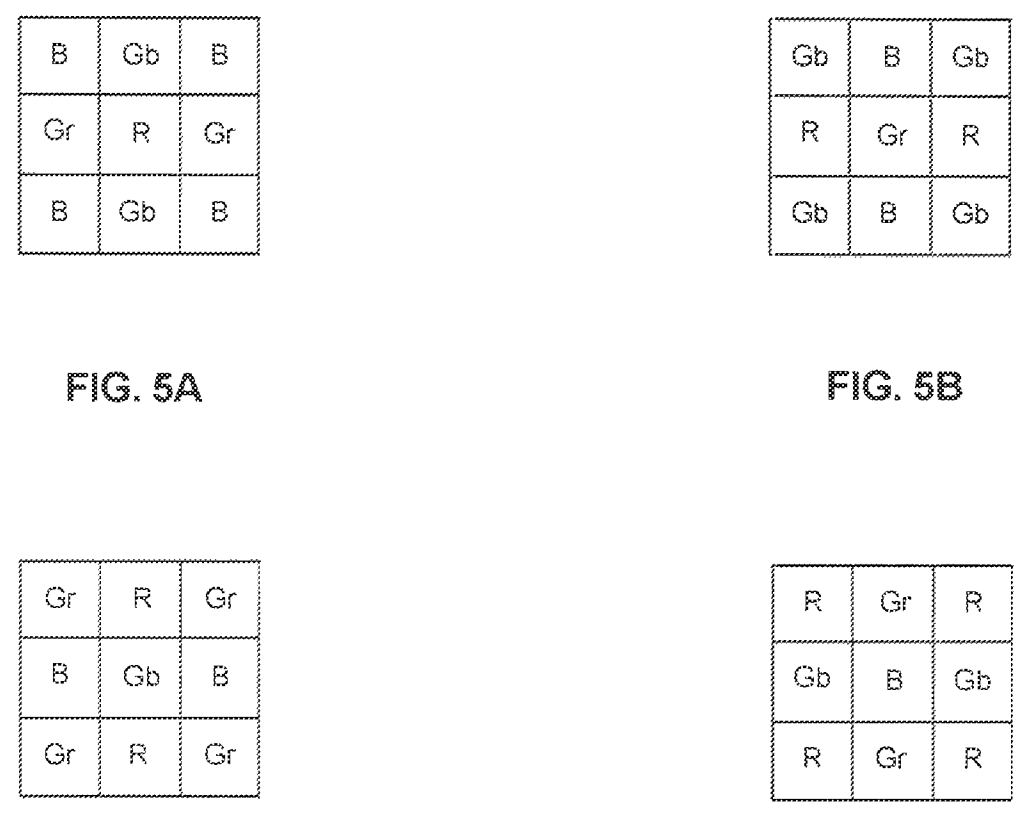

FIGS. 5(*a*)-(*d*) illustrate different types of exemplary neighborhood blocks in an RGB image, in accordance with various embodiments of the present invention. FIG. 5A shows a three-by-three (3×3) neighborhood block with a red color pixel (R) locating at the center of the neighborhood block. FIG. 5B shows a three-by-three (3×3) neighborhood block with a green color pixel (Gr) locating at the center of the neighborhood block. FIG. 5C shows a three-by-three (3×3) neighborhood block with a blue color pixel (B) locating at the center of the neighborhood block. FIG. 5D shows a three-by-three (3×3) neighborhood block with a green color pixel (Gb) locating at the center of the neighborhood block.

Figure 6:
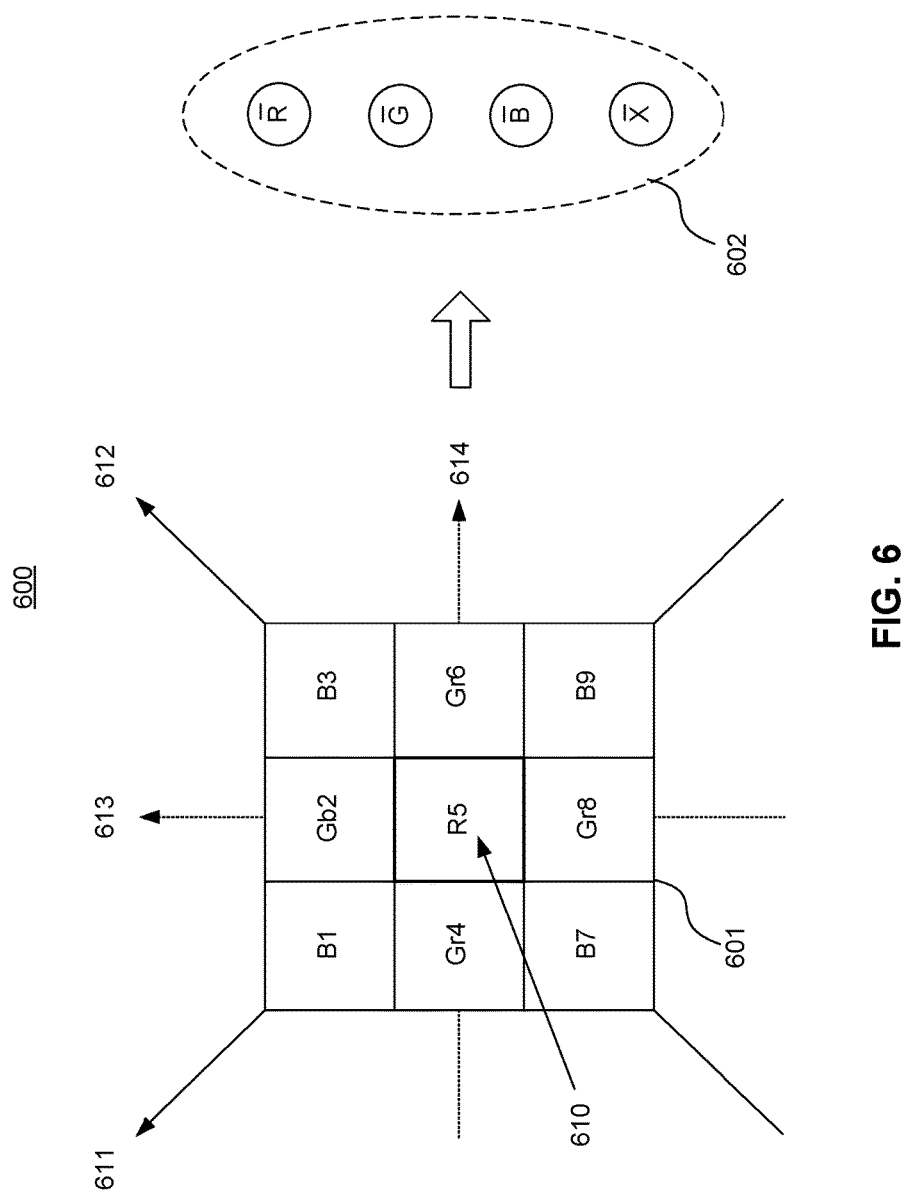
FIG. 6 is an exemplary illustration of supporting dimensionality reduction for a neighborhood block in FIG. 5A, in accordance with various embodiments of the present invention.

FIG. 6 is an exemplary illustration of supporting dimensionality reduction for a neighborhood block in FIG. 5A, in accordance with various embodiments of the present invention. As shown in FIG. 6, an imaging process 600 can determine a characterization vector 602 for a neighborhood block 601 in an RGB image.

The characterization vector 602 can include various color components, such as a component associated with the red color ($\overline{R}$), a component associated with the green color ($\overline{G}$), a component associated with the blue color ($\overline{B}$).

As shown in FIG. 6, the center pixel 610 in the neighborhood block 601 is a red color pixel (R5). Thus, the component associated with the red color ($\overline{R}$) in the characterization vector 602 can be determined based on the value of the red color pixel, R5.

Additionally, the blue color pixels (B1, B3, B7 and B9) in the neighborhood block 601 constitute multiple directions through the center pixel (R5) 610. As shown in FIG. 6, the direction 611 involves the blue color pixels (B1 and B9) and the direction 612 involves the blue color pixels (B3 and B7).

In order to determine the component associated with the blue color ($\overline{B}$), the imaging process 600 can calculate a gradient (e.g. grad_B1) for the direction 611 and a gradient (e.g. grad_B2) for the direction 612. Then, the imaging process 600 can determine the maximum gradient (e.g. grad_max) and the minimum gradient (e.g. grad_min) based on the gradients, grad_B1 and grad_B2.

If |grad_max-grad_min|>TH, the imaging process 600 can use the selective averaging method for determining the component associated with the blue color ($\overline{B}$). For example, the imaging process 600 can select the blue pixels (B1 and B9), if the grad_B1 along the direction 611 is less than the grad_B2 along the direction 612. Also, the imaging process 600 can select the blue pixels (B3 and B7), if the grad_B1 along the direction 611 is larger than the grad_B2 along the direction 612. The imaging process 600 can select either the blue pixels (B1 and B9) or the blue pixels (B3 and B7), if the grad_B1 along the direction 611 is equal to the grad_B2 along the direction 612. Then, the imaging process 600 can use the average value for the selected blue pixels for determining the component associated with the blue color ($\overline{B}$).

Otherwise, if |grad_max-grad_min|<=TH, the imaging process 600 can use the non-selective averaging method for determining the component associated with the blue color ($\overline{B}$) based on the average value for the blue pixels (B1, B3, B7, and B9) in the neighborhood block 601.

Also as shown in FIG. 6, the green color pixels (Gb2, Gr4, Gr6 and Gb8) in the neighborhood block 601 constitute multiple directions through the center pixel (R5) 610. The direction 613 involves the green color pixels (Gb2 and Gb8) and the direction 614 involves the green color pixels (Gr4 and Gr6).

In order to determine the component associated with the green color ($\overline{G}$), the imaging process 600 can calculate a gradient (e.g. grad_G1) for the direction 613 and a gradient (e.g. grad_G2) for the direction 614. Then, the imaging process 600 can determine the maximum gradient (e.g. grad_max) and the minimum gradient (e.g. grad_min) based on the gradients, grad_G1 and grad_G2.

If |grad_max-grad_min|>TH, the imaging process 600 can use the selective averaging method for determining the component associated with the blue color ($\overline{G}$). For example, the imaging process 600 can select the green pixels (Gb2 and Gb8), if the grad_G1 along the direction 613 is less than the grad_G2 along the direction 614. Also, the imaging process 600 can select the green pixels (Gr4 and Gr6), if the grad_G1 along the direction 613 is larger than the grad_G2 along the direction 614. The imaging process 600 can select either the green pixels (Gb2 and Gb8) or the green pixels (Gr4 and Gr6), if the grad_G1 along the direction 613 is equal to the grad_G2 along the direction 614. Then, the imaging process 600 can use the average value for the selected blue pixels for determining the component associated with the green color ($\overline{G}$).

Otherwise, if |grad_max-grad_min|<=TH, the imaging process 600 can use the non-selective averaging method for determining the component associated with the green color ($\overline{G}$) based on the average value for the green pixels (Gb2, Gr4, Gr6 and Gb8) in the neighborhood block 601.

Thus, the characterization vector 602 can be represented using the following equation.

$$P=[\overline{RGB}]^T$$

Additionally, the characterization vector 602 may include a component associated with the grayscale ($\overline{X}$), which can be defined using the following equation.

$$\overline{X}=(\overline{R}+2\times\overline{G}+\overline{B})>>2$$

As shown in the above, the grayscale component ($\overline{X}$) accounts for the contribution from the different color components, i.e. the contribution by the red color component ($\overline{R}$), the contribution by the green color component ($\overline{G}$), and the contribution by the blue color component ($\overline{B}$).

Thus, the characterization vector 602 can be represented using the following equation.

$$P=[\overline{RGBX}]^T$$

Figure 7:
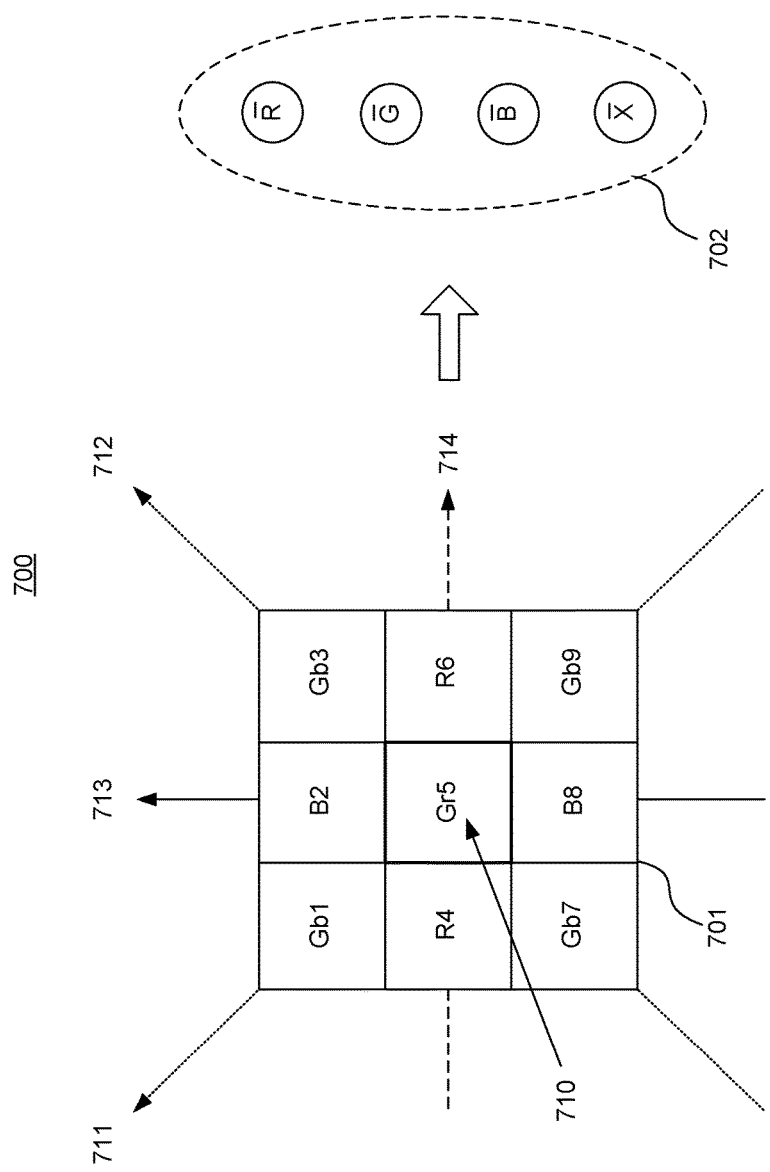
FIG. 7 is an exemplary illustration of supporting dimensionality reduction for a neighborhood block in FIG. 5B, in accordance with various embodiments of the present invention.

FIG. 7 is an exemplary illustration of supporting dimensionality reduction for a neighborhood block in FIG. 5B, in accordance with various embodiments of the present invention. As shown in FIG. 7, an imaging process 700 can determine a characterization vector 702 for a neighborhood block 701 in an RGB image.

The characterization vector 702 can include different components, such as a component associated with the red color ($\overline{R}$), a component associated with the green color ($\overline{G}$), a component associated with the blue color ($\overline{B}$).

As shown in FIG. 7, the center pixel 710 of the neighborhood block 701 is a green color pixel (Gr5). Thus, the component associated with the green color ($\overline{G}$) can be determined based on the value of the green color pixel, Gr5.

Furthermore, the blue color pixels (B2 and B8) constitute a single direction 713 in the neighborhood block 701. Thus, the component associated with the blue color ($\overline{B}$) can be determined based on the average value for the blue color pixels (B2 and B8) along the direction 713 in the neighborhood block 701.

Additionally, the red color pixels (R4 and R6) constitute a single direction 714 in the neighborhood block 701. Thus, the component associated with the red color ($\bar{R}$) can be determined based on the average value for the red color pixels (R4 and R6) along the direction 714 in the neighborhood block 701.

Thus, the characterization vector 702 can be represented using the following equation.

$$P=[\overline{RGB}]^T$$

Additionally, the characterization vector 702 may include a component associated with the grayscale ($\bar{X}$), as defined in the following equation.

$$\bar{X}=(\bar{R}+2\times\bar{G}_{edge}+\bar{B})>>2$$

As shown in the above, the grayscale component ($\bar{X}$) accounts for the contribution from the different color components, i.e. the contribution by the red color component ($\bar{R}$), the contribution by the green color component ($\bar{G}_{edge}$), and the contribution by the blue color component ($\bar{B}$).

As shown in FIG. 7, the green color pixels (Gb1, Gb3, Gb7, and Gb9) in the neighborhood block 701 constitute multiple direction through the center pixel (Gr5) 710. The imaging process 700 can calculate a gradient (e.g. grad_G1) for the direction 711 and a gradient (e.g. grad_G2) for the direction 712. Then, the imaging process 700 can determine the maximum gradient (e.g. grad_max) and the minimum gradient (e.g. grad_min) based on the gradients, grad_G1 and grad_G2.

If |grad_max-grad_min|>TH, the imaging process 700 can use the selective averaging method for determining the contribution by the green color component ($\bar{G}_{edge}$). For example, the imaging process 700 can select the green pixels (Gb1 and Gb9), if the grad_G1 along the direction 711 is less than the grad_G2 along the direction 712. Also, the imaging process 700 can select the green pixels (Gb3 and Gb7), if the grad_G1 along the direction 711 is larger than the grad_G2 along the direction 712. The imaging process 700 can select either the green pixels (Gb1 and Gb9) or the green pixels (Gb3 and Gb7), if the grad_G1 along the direction 711 is equal to the grad_G2 along the direction 712. Then, the imaging process 700 can use the average value for the selected blue pixels for determining the contribution by the green color component ($\bar{G}_{edge}$).

Otherwise, if |grad_max-grad_min|<=TH, the imaging process 700 can use the non-selective averaging method for determining the contribution by the green color component ($\bar{G}_{edge}$) based on the average value for all green pixels (Gb1, Gb3, Gb7, and Gb9) in the neighborhood block 701.

Accordingly, the characterization vector 702 can be represented using the following equation.

$$P=[\overline{RGBX}]^T$$

Figure 8:
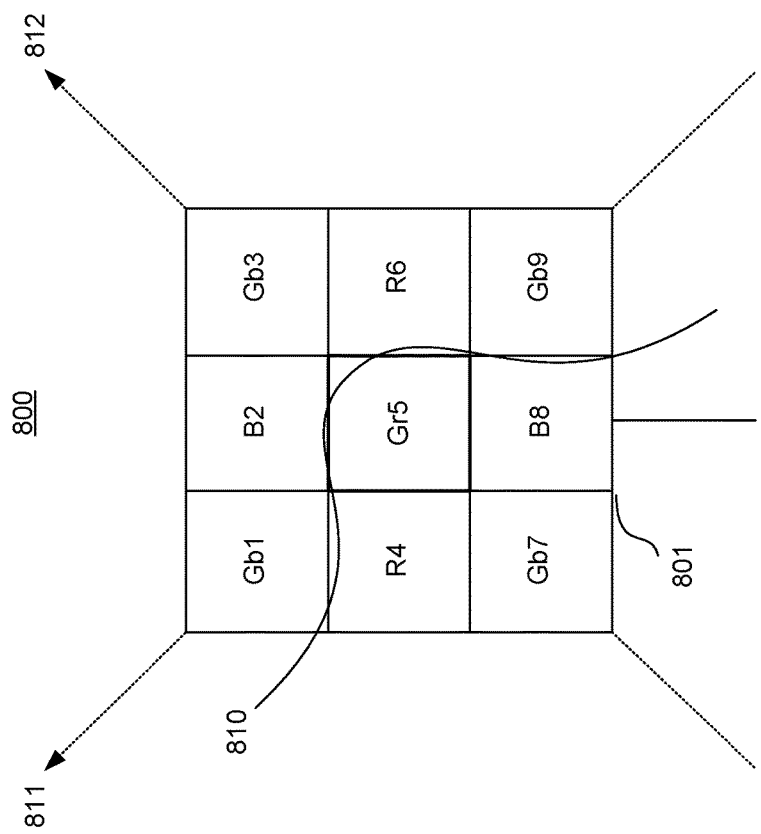
FIG. 8 is an exemplary illustration of preserving an edge line in a neighborhood block, in accordance with various embodiments of the present invention.

FIG. 8 is an exemplary illustration of preserving an edge line in a neighborhood block, in accordance with various embodiments of the present invention. As shown in FIG. 8, an edge line 810 in an RGB image may cross through a neighborhood block 801 with a green center pixel (Gr5).

For example, the pixels (Gb1, B2, Gb3, R6, and Gb9) may locate on the light color side, while the pixels (R4, Gr5, Gb7, and B8) locates on the dark color side. Thus, the gradient along the direction 811, which involves the green pixels (Gb1 and Gb9) locating on the same side of the edge line 810, should be less than the gradient along the direction 812, which involves the green pixels (Gb3 and Gb7) locating on the opposite sides of the edge line 810.

Using the selective averaging method, the green color contribution to the grayscale ($\bar{G}_{edge}$) can be determined based on the average value of the green pixels (Gb1 and Gb9).

On the other hand, the component associated with the green color ($\bar{G}$) can be determined based on the value of the green color center pixel (Gr5), which is likely larger than the average value of Gb1 and Gb9 (i.e. $\bar{G}_{edge}$).

As a result, the imaging process 800 can avoid smoothing out the green color center pixel (Gr5), which ensures that the edge line 810 is preserved, during the denoising operation.

Figure 9:
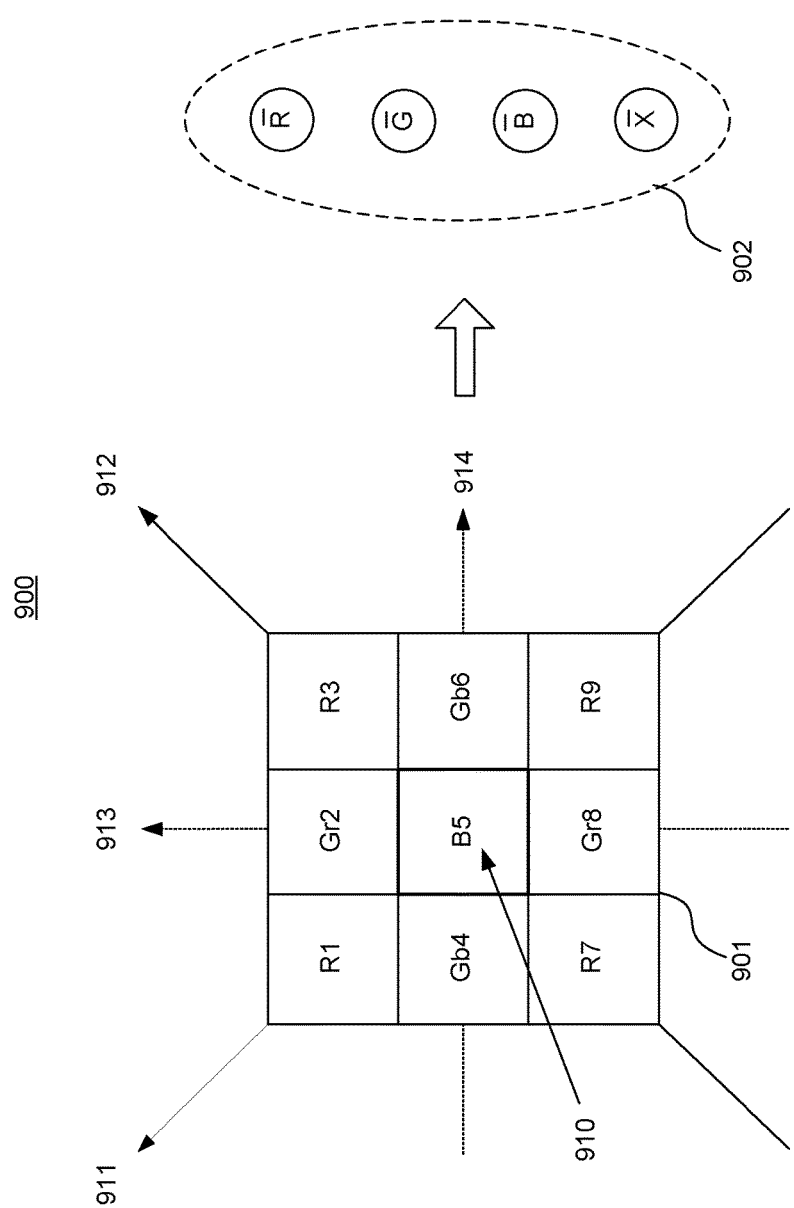
FIG. 9 is an exemplary illustration of supporting dimensionality reduction for a neighborhood block in FIG. 5C, in accordance with various embodiments of the present invention.

FIG. 9 is an exemplary illustration of supporting dimensionality reduction for a neighborhood block in FIG. 5C, in accordance with various embodiments of the present invention. As shown in FIG. 9, an imaging process 900 can determine a characterization vector 902 for a neighborhood block 901 in an RGB image.

The characterization vector 902 can include various color components, such as a component associated with the red color ($\bar{R}$), a component associated with the green color ($\bar{G}$), a component associated with the blue color ($\bar{B}$).

As shown in FIG. 9, the center pixel 910 in the neighborhood block 901 is a blue color pixel (B5). Thus, the component associated with the blue color ($\bar{B}$) in the characterization vector 902 can be determined based on the value of the blue color pixel, B5.

Additionally, the red color pixels (R1, R3, R7 and R9) in the neighborhood block 901 constitute multiple directions through the center pixel (B5) 910. As shown in FIG. 9, the direction 911 involves the red color pixels (R1 and R9) and the direction 912 involves the red color pixels (R3 and R7).

In order to determine the component associated with the red color ($\bar{R}$), the imaging process 900 can calculate a gradient (e.g. grad_R1) for the direction 911 and a gradient (e.g. grad_R2) for the direction 912. Then, the imaging process 900 can determine the maximum gradient (e.g. grad_max) and the minimum gradient (e.g. grad_min) based on the gradients, grad_R1 and grad_R2.

If |grad_max-grad_min|>TH, the imaging process 900 can use the selective averaging method for determining the component associated with the red color ($\bar{R}$). For example, the imaging process 900 can select the red pixels (R1 and R9), if the grad_R1 along the direction 911 is less than the grad_R2 along the direction 912. Also, the imaging process 900 can select the red pixels (R3 and R7), if the grad_R1 along the direction 911 is larger than the grad_R2 along the direction 912. The imaging process 900 can select either the red pixels (R1 and R9) or the red pixels (R3 and R7), if the grad_R1 along the direction 911 is equal to the grad_R2 along the direction 912. Then, the imaging process 900 can use the average value for the selected red pixels to determine the component associated with the red color ($\bar{R}$).

Otherwise, if |grad_max-grad_min|<=TH, the imaging process 900 can use the non-selective averaging method for determining the component associated with the red color ($\bar{R}$) based on the average value for the red pixels (R1, R3, R7, and R9) in the neighborhood block 901.

Also as shown in FIG. 9, the green color pixels (Gr2, Gb4, Gb6 and Gr8) in the neighborhood block 901 constitute multiple directions through the center pixel (B5) 910. The direction 913 involves the green color pixels (Gr2 and Gr8) and the direction 914 involves the green color pixels (Gb4 and Gb6).

In order to determine the component associated with the green color ($\bar{G}$), the imaging process 900 can calculate a gradient (e.g. grad_G1) for the direction 913 and a gradient (e.g. grad_G2) for the direction 914. Then, the imaging process 900 can determine the maximum gradient (e.g. grad_max) and the minimum gradient (e.g. grad_min) based on the gradients, grad_G1 and grad_G2.

If |grad_max-grad_min|>TH, the imaging process 900 can use the selective averaging method for determining the component associated with the green color ($\overline{G}$). For example, the imaging process 600 can select the green pixels (Gr2 and Gr8), if the grad_G1 along the direction 913 is less than the grad_G2 along the direction 914. Also, the imaging process 900 can select the green pixels (Gb4 and Gb6), if the grad_G1 along the direction 913 is larger than the grad_G2 along the direction 914. The imaging process 900 can select either the green pixels (Gr2 and Gr8) or the green pixels (Gb4 and Gb6), if the grad_G1 along the direction 913 is equal to the grad_G2 along the direction 914. Then, the imaging process 900 can use the average value for the selected green pixels for determining the component associated with the green color ($\overline{G}$).

Otherwise, if |grad_max-grad_min|<=TH, the imaging process 900 can use the non-selective averaging method for determining the component associated with the green color ($\overline{G}$) based on the average value for the green pixels (Gr2, Gb4, Gb6 and Gr8) in the neighborhood block 901.

Thus, the characterization vector 902 can be represented as in the following.

$$P=[\overline{RGB}]^T$$

Additionally, the characterization vector 902 may include a component associated with the grayscale ($\overline{X}$), which can be defined using the following equation.

$$\overline{X}=(\overline{R}+2\times\overline{G}+\overline{B})>>2$$

As shown in the above, the grayscale component ($\overline{X}$) accounts for the contribution from the different color components, i.e. the contribution by the red color component ($\overline{R}$), the contribution by the green color component ($\overline{G}$), and the contribution by the blue color component ($\overline{B}$).

Thus, the characterization vector 602 can be represented using the following equation.

$$P=[\overline{RGBX}]^T$$

Figure 10:
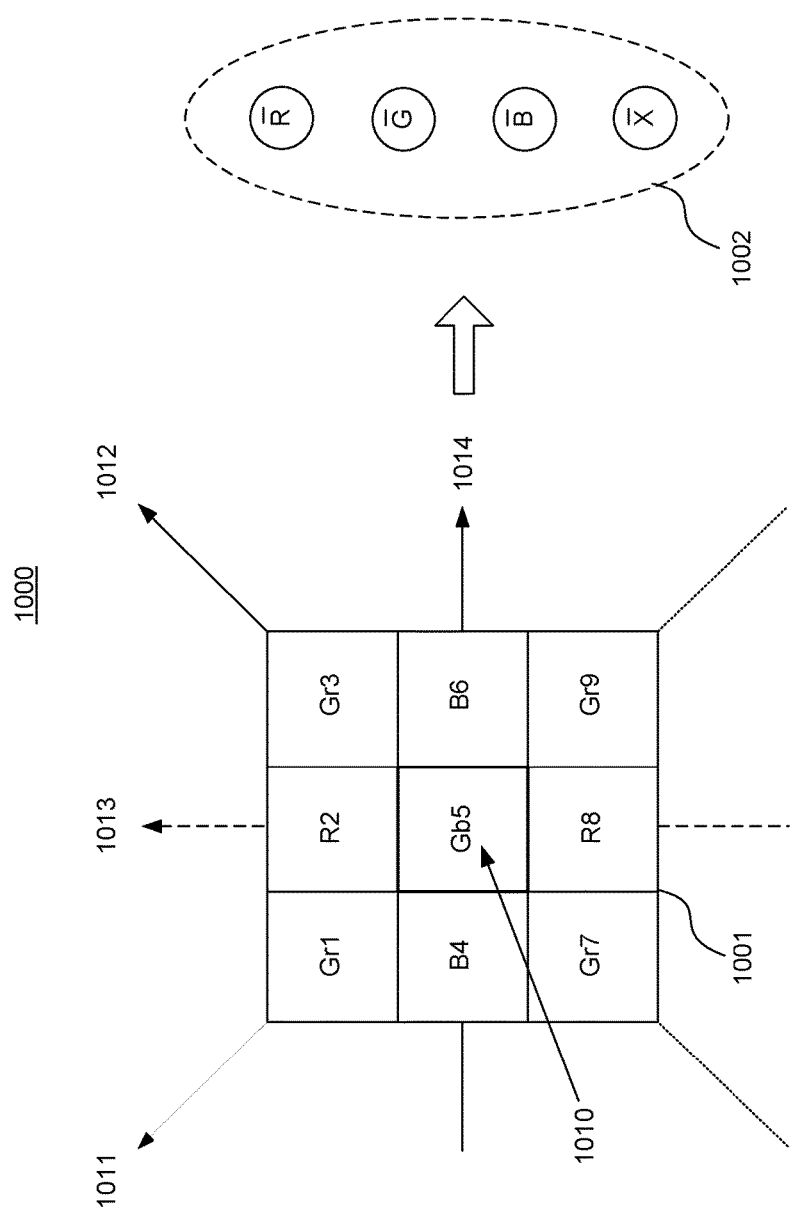
FIG. 10 is an exemplary illustration of supporting dimensionality reduction for a neighborhood block in FIG. 5D, in accordance with various embodiments of the present invention.

FIG. 10 is an exemplary illustration of supporting dimensionality reduction for a neighborhood block in FIG. 5D, in accordance with various embodiments of the present invention. As shown in FIG. 10, an imaging process 1000 can determine a characterization vector 1002 for a neighborhood block 1001 in an RGB image.

The characterization vector 1002 can include different components, such as a component associated with the red color ($\overline{R}$), a component associated with the green color ($\overline{G}$), a component associated with the blue color ($\overline{B}$).

As shown in FIG. 10, the center pixel 1010 of the neighborhood block 1001 is a green color pixel (Gb5). Thus, the component associated with the green color ($\overline{G}$) can be determined based on the value of the green color pixel, Gb5.

Furthermore, the red color pixels (R2 and R8) constitute a single direction 1013 in the neighborhood block 1001. Thus, the component associated with the red color ($\overline{R}$) can be determined based on the average value for the blue color pixels (R2 and R8) along the direction 1013 in the neighborhood block 1001.

Additionally, the blue color pixels (B4 and B6) constitute a single direction 1014 in the neighborhood block 1001. Thus, the component associated with the blue color ($\overline{B}$) can be determined based on the average value for the blue color pixels (B4 and B6) along the direction 1014 in the neighborhood block 1001.

Thus, the characterization vector 1002 can be represented using the following equation.

$$P=[\overline{RGB}]^T$$

Additionally, the characterization vector 1002 may include a component associated with the grayscale ($\overline{X}$), as defined in the following equation.

$$\overline{X}=(\overline{R}+2\times\overline{G}_{edge}+\overline{B})>>2$$

As shown in the above, the grayscale component ($\overline{X}$) accounts for the contribution from the different color components, i.e. the contribution by the red color component ($\overline{R}$), the contribution by the green color component ($\overline{G}_{edge}$), and the contribution by the blue color component ($\overline{B}$).

As shown in FIG. 10, the green color pixels (Gr1, Gr3, Gr7, and Gr9) in the neighborhood block 1001 constitute multiple direction through the center pixel (Gb5) 1010. The imaging process 1000 can calculate a gradient (e.g. grad_G1) for the direction 1011 and a gradient (e.g. grad_G2) for the direction 1012. Then, the imaging process 1000 can determine the maximum gradient (e.g. grad_max) and the minimum gradient (e.g. grad_min) based on the gradients, grad_G1 and grad_G2.

If |grad_max-grad_min|>TH, the imaging process 1000 can use the selective averaging method for determining the contribution by the green color component ($\overline{G}_{edge}$). For example, the imaging process 1000 can select the green pixels (Gr1 and Gr9), if the grad_G1 along the direction 1011 is less than the grad_G2 along the direction 1012. Also, the imaging process 1000 can select the green pixels (Gr3 and Gr7), if the grad_G1 along the direction 1011 is larger than the grad_G2 along the direction 1012. The imaging process 1000 can select either the green pixels (Gr1 and Gr9) or the green pixels (Gr3 and Gr7), if the grad_G1 along the direction 1011 is equal to the grad_G2 along the direction 1012. Then, the imaging process 1000 can use the average value for the selected blue pixels for determining contribution by the green color component ($\overline{G}_{edge}$).

Otherwise, if |grad_max-grad_min|<=TH, the imaging process 1000 can use the non-selective averaging method for determining the contribution by the green color component ($\overline{G}_{edge}$) based on the average value for all green pixels (Gr1, Gr3, Gr7, and Gr9) in the neighborhood block 1001.

Accordingly, the characterization vector 1002 can be represented using the following equation.

$$P=[\overline{RGBX}]^T$$

As a result, the imaging process 1000 can avoid smoothing out the green color center pixel (Gb5) and can preserve a edge line during the denoising operation.

Figure 11:
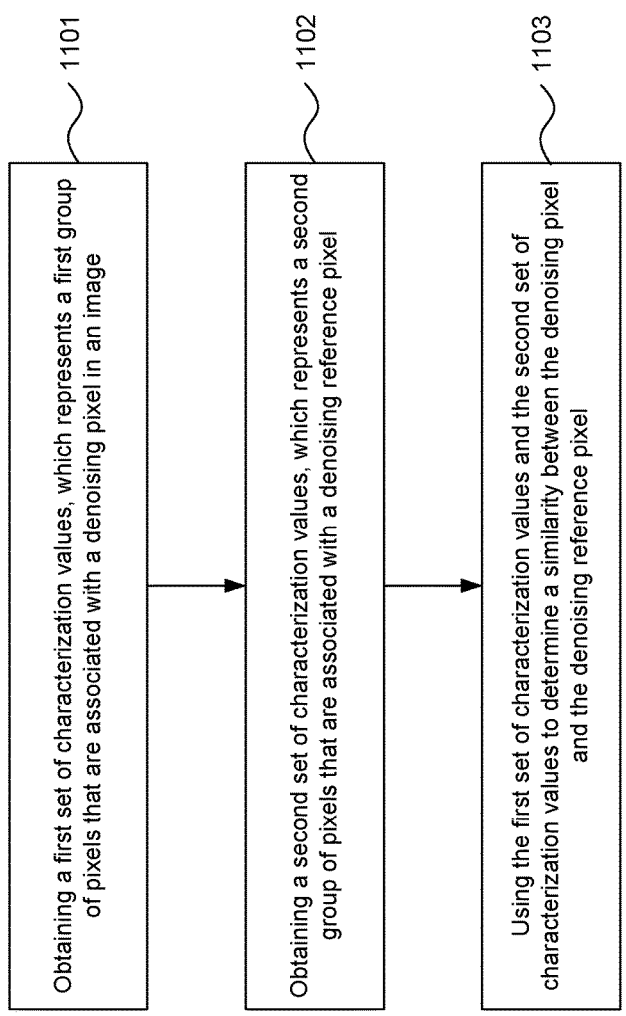
FIG. 11 shows a flowchart of supporting image denoising based on neighborhood block dimensionality reduction, in accordance with various embodiments of the present invention.

FIG. 11 shows a flowchart of supporting image denoising based on neighborhood block dimensionality reduction, in accordance with various embodiments of the present invention. As shown in FIG. 11, at step 1101, an imaging process can obtain a first set of characterization values, which represents a first group of pixels that are associated with a denoising pixel in an image. Furthermore, at step 1102, the imaging process can obtain a second set of characterization values, which represents a second group of pixels that are associated with a denoising reference pixel. Then, at step 1103, the imaging process can use the first set of characterization values and the second set of characterization values to determine a similarity between the denoising pixel and the denoising reference pixel.

Many features of the present invention can be performed in, using, or with the assistance of hardware, software, firmware, or combinations thereof. Consequently, features of the present invention may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An image processing method, comprising:
    obtaining one or more characterization values of a group of pixels associated with a denoising pixel in a filter window of an image, wherein the one or more characterization values are determined based on gradient information of the group of pixels;
    using the one or more characterization values to determine a similarity between the denoising pixel and a denoising reference pixel in the filter window of the image; and
    calculating a denoised value for the denoising pixel based on the determined similarity between the denoising pixel and the denoising reference pixel.

2. The image processing method of claim 1, wherein the filter window includes a plurality of denoising reference pixels.

3. The image processing method of claim 2, further comprising:
    determining weights for the plurality of denoising reference pixels in the filter window, each weight being associated with a different denoising reference pixel in the plurality of denoising reference pixels, wherein the weights are determined based on similarities between each denoising reference pixel and a corresponding denoising pixel in the image; and
    using at least one determined weight of the denoising reference pixels to calculate the denoised value for the denoising pixel.

4. The image processing method of claim 1, wherein:
    the image is based on a color model, and wherein the one or more characterization values comprise a color component associated with a color in the color model.

5. The image processing method of claim 4, wherein:
    the one or more characterization values comprise one of a red component, a green component, or a blue component of the color model.

6. The image processing method of claim 4, further comprising:
    calculating the gradient information of the group of pixels along a first direction in the image, the group of pixels along the first direction comprising a plurality of pixels of the same color in the color model as the color component included in the one or more characterization values.

7. The image processing method of claim 6, further comprising:
    calculating second gradient information for a second group of pixels along a second direction in the image, the second direction being different from the first direction, wherein the second group of pixels comprises a plurality of pixels of the same color in the color model as the color component included in the one or more characterization values; and averaging pixel values along the first and second directions to determine the one or more characterization values.

8. The image processing method of claim 6, further comprising:
calculating a second gradient information for a second group of pixels along a second direction in the image, the second direction being different from the first direction, wherein the second group of pixels comprises a plurality of pixels of the same color in the color model as the color component included in the one or more characterization values;
identifying which of the first and second directions has a minimum gradient information; and
averaging pixel values along the identified direction having the minimum gradient information to determine the one or more characterization values.

9. The image processing method of claim 4, wherein:
the color model is a RGB color model and the image is a Bayer image.

10. The image processing method of claim 1, wherein the one or more characterization values comprise a grayscale component of the image.

11. The image processing method of claim 10, further comprising:
using the grayscale component included in the one or more characterization values to handle an edge effect in a neighborhood block with a green center pixel.

12. The image processing method of claim 1, wherein:
the group of pixels is within a neighborhood block surrounding the denoising pixel.

13. The image processing method of claim 1, further comprising:
obtaining at least one additional characterization value associated with a second group of pixels in the filter window, wherein the at least one additional characterization value is determined based on gradient information of the second group of pixels; and
using the at least one additional characterization value to determine the similarity between the denoising pixel and the denoising reference pixel.

14. An image processing apparatus, comprising:
at least one memory configured to store instructions for execution by one or more processors in the image processing apparatus; and
one or more processors configured to execute the instructions stored in the at least one memory, the instructions when executed by the one or more processors configure the image processing apparatus to:
obtain one or more characterization values of a group of pixels associated with a denoising pixel in a filter window of an image, wherein the one or more characterization values are determined based on gradient information of the group of pixels;
utilize the one or more characterization values to determine a similarity between the denoising pixel and a denoising reference pixel in the filter window of the image; and
calculate a denoised value for the denoising pixel based on the determined similarity between the denoising pixel and the denoising reference pixel.

15. The image processing apparatus of claim 14, wherein the filter window includes a plurality of denoising reference pixels.

16. The image processing apparatus of claim 15, wherein the instructions configure the image processing apparatus to:
determine weights for the plurality of denoising reference pixels in the filter window, each weight being associated with a different denoising reference pixel in the plurality of denoising reference pixels, wherein the weights are determined based on similarities between each denoising reference pixel and a corresponding denoising pixel in the image; and
utilize at least one determined weight of the denoising reference pixels to calculate the denoised value for the denoising pixel.

17. The image processing apparatus of claim 14, wherein:
the image is based on a color model, and wherein the one or more characterization values comprise a color component associated with a color in the color model.

18. The image processing apparatus of claim 17, wherein:
the one or more characterization values comprise one of a red component, a green component, or a blue component of the color model.

19. The image processing apparatus of claim 17, wherein the instructions configure the image processing apparatus to:
calculate the gradient information of the group of pixels along a first direction in the image, the group of pixels along the first direction comprising a plurality of pixels of the same color in the color model as the color component included in the one or more characterization values.

20. The image processing apparatus of claim 19, wherein the instructions configure the image processing apparatus to:
calculate second gradient information for a second group of pixels along a second direction in the image, the second direction being different from the first direction, wherein the second group of pixels comprises a plurality of pixels of the same color in the color model as the color component included in the one or more characterization values; and
average pixel values along the first and second directions to determine the one or more characterization values.

21. The image processing apparatus of claim 19, wherein the instructions configure the image processing apparatus to:
calculate a second gradient information for a second group of pixels along a second direction in the image, the second direction being different from the first direction, wherein the second group of pixels comprises a plurality of pixels of the same color in the color model as the color component included in the one or more characterization values;
identify which of the first and second directions has a minimum gradient information; and
average pixel values along the identified direction having the minimum gradient information to determine the one or more characterization values.

22. The image processing apparatus of claim 17, wherein:
the color model is a RGB color model and the image is a Bayer image.

23. The image processing apparatus of claim 14, wherein the one or more characterization values comprise a grayscale component of the image.

24. The image processing apparatus of claim 23, wherein the instructions configure the image processing apparatus to:
utilize the grayscale component included in the one or more characterization values to handle an edge effect in a neighborhood block with a green center pixel.

25. The image processing apparatus of claim 14, wherein:
the group of pixels is within a neighborhood block surrounding the denoising pixel.

26. The image processing apparatus of claim 14, wherein the instructions configure the image processing apparatus to:

obtain at least one additional characterization value associated with a second group of pixels in the filter window, wherein the at least one additional characterization value is determined based on gradient information of the second group of pixels; and utilize the at least one additional characterization value to determine the similarity between the denoising pixel and the denoising reference pixel.

27. A non-transitory computer-readable medium with instructions stored thereon, that when executed by a processor, perform the steps comprising:

obtaining one or more characterization values of a group of pixels associated with a denoising pixel in a filter window of an image, wherein the one or more characterization values are determined based on gradient information of the group of pixels;

using the one or more characterization values to determine a similarity between the denoising pixel and a denoising reference pixel in the filter window of the image; and calculating a denoised value for the denoising pixel based on the determined similarity between the denoising pixel and the denoising reference pixel.

28. An image processing system, comprising:

a first processor configured to obtain one or more characterization values of a group of pixels associated with a denoising pixel in a filter window of an image, wherein the one or more characterization values are determined based on gradient information of the group of pixels;

a second processor configured to utilize the one or more characterization values to determine a similarity between the denoising pixel and a denoising reference pixel in the filter window of the image; and a third processor configured to calculate a denoised value for the denoising pixel based on the determined similarity between the denoising pixel and the denoising reference pixel.

\* \* \* \* \*